United States Patent
Flanigan

(10) Patent No.: US 7,134,006 B2
(45) Date of Patent: Nov. 7, 2006

(54) METHOD AND SYSTEM FOR CHANGING SOFTWARE ACCESS LEVEL WITHIN OR OUTSIDE A HOST PROTECTED AREA

(75) Inventor: Edward P. Flanigan, Burbank, SD (US)

(73) Assignee: Gateway Inc., Irvine, CA (US)

( * ) Notice: Subject to any disclaimer, the term of this patent is extended or adjusted under 35 U.S.C. 154(b) by 441 days.

(21) Appl. No.: 10/453,416

(22) Filed: Jun. 3, 2003

(65) Prior Publication Data

US 2004/0250055 A1   Dec. 9, 2004

(51) Int. Cl.
G06F 9/00 (2006.01)
(52) U.S. Cl. .................. 713/1; 713/1; 713/2; 713/100
(58) Field of Classification Search .................. 713/1, 713/2, 100
See application file for complete search history.

(56) References Cited

U.S. PATENT DOCUMENTS

| | | | |
|---|---|---|---|
| 5,136,713 A * | 8/1992 | Bealkowski et al. ........... 713/2 |
| 5,187,792 A * | 2/1993 | Dayan et al. ................... 713/2 |
| 5,237,669 A * | 8/1993 | Spear et al. .................... 711/2 |
| 5,475,829 A | 12/1995 | Thome ........................ 395/479 |
| 5,586,285 A * | 12/1996 | Hasbun et al. ............... 711/103 |
| 5,812,446 A * | 9/1998 | Tailliet ................... 365/185.04 |
| 5,966,732 A * | 10/1999 | Assaf .......................... 711/170 |
| 5,978,903 A | 11/1999 | Quimby et al. ............. 712/229 |
| 6,009,520 A * | 12/1999 | Gharda .......................... 713/1 |
| 6,092,161 A * | 7/2000 | White et al. ................. 711/163 |
| 6,178,550 B1 | 1/2001 | Pearce ............................ 717/9 |
| 6,292,384 B1 | 9/2001 | O'Neill ........................ 365/94 |
| 6,308,265 B1 | 10/2001 | Miller ........................... 713/2 |
| 6,336,175 B1 | 1/2002 | Shaath et al. ............... 711/163 |
| 2002/0129217 A1* | 9/2002 | Nichols ....................... 711/173 |
| 2003/0070035 A1* | 4/2003 | Wang ......................... 711/103 |

OTHER PUBLICATIONS

The GNU Parted Manual, Andrew Clausen and Richard Kreuter, May 13, 2002, http://www.gnu.org/software/parted/manual/html_mono/parted.html Sections 1.6, 2.47, 2.4.13, 2.4.16, 2.51 and 2.5.2.*

* cited by examiner

*Primary Examiner*—Thomas Lee
*Assistant Examiner*—Sean Weinman
(74) *Attorney, Agent, or Firm*—Chao Swantz; Suiter West Swantz PC LLO

(57) ABSTRACT

A method and system divides a media space, such as found in a hard drive or other mass storage device, into a portion directly accessible by all software and a portion inaccessible by all software except host Basic Input Output System (BIOS) code. A special procedure to access media space may include a special instruction or instruction set with or without a password to allow hard drive support for READ ONLY partitions, READ ONLY CD-ROM emulation, and other READ ONLY hard drive access requirements. The special procedure may user an expanded ATA command set, an expanded BIOS command set with System Management Mode, or code to temporarily unprotect at least a portion of the portion normally inaccessible by the software other than host BIOS code.

18 Claims, 17 Drawing Sheets

FIG. 8

| COMMAND BLOCK OUTPUT REGISTERS | |
|---|---|
| REGISTER | 7 6 5 4 3 2 1 0 |
| DATA | - - - - - - - - |
| FEATURE | - - - - - - - - |
| SECTOR COUNT | - - - - - - - - |
| SECTOR NUMBER | - - - - - - - - |
| CYLINDER LOW | - - - - - - - - |
| CYLINDER HIGH | - - - - - - - - |
| DEVICE/ HEAD | 1 L 1 D - - - - |
| COMMAND | 1 1 1 1 1 0 0 0 |

FIG. 9

| COMMAND BLOCK OUTPUT REGISTERS | |
|---|---|
| REGISTER | 7 6 5 4 3 2 1 0 |
| DATA | - - - - - - - - |
| ERROR | - - - - - - - - |
| SECTOR COUNT | - - - - - - - - |
| SECTOR NUMBER | V V V V V V V V |
| CYLINDER LOW | V V V V V V V V |
| CYLINDER HIGH | V V V V V V V V |
| DEVICE/ HEAD | - - - - H H H H |
| COMMAND | |

| COMMAND BLOCK OUTPUT REGISTERS | |
|---|---|
| REGISTER | 7 6 5 4 3 2 1 0 |
| DATA | - - - - - - - - |
| FEATURE | - - - - - - - - |
| SECTOR COUNT | - - - - - - - B |
| SECTOR NUMBER | V V V V V V V V |
| CYLINDER LOW | V V V V V V V V |
| CYLINDER HIGH | V V V V V V V V |
| DEVICE/ HEAD | 1 L 1 D V V V V |
| COMMAND | 1 1 1 1 1 0 0 1 |

FIG. 10

| COMMAND BLOCK OUTPUT REGISTERS | |
|---|---|
| REGISTER | 7 6 5 4 3 2 1 0 |
| DATA | - - - - - - - - |
| FEATURE | - - - - - - - - |
| SECTOR COUNT | - - - - - - - - |
| SECTOR NUMBER | - - - - - - - - |
| CYLINDER LOW | - - - - - - - - |
| CYLINDER HIGH | - - - - - - - - |
| DEVICE/ HEAD | 1 L 1 D - - - - |
| COMMAND | 1 1 1 1 1 0 1 0 |

FIG. 11

| COMMAND BLOCK OUTPUT REGISTERS | |
|---|---|
| REGISTER | 7 6 5 4 3 2 1 0 |
| DATA | - - - - - - - - |
| FEATURE | - - - - - - - - |
| SECTOR COUNT | - - - - - - - - |
| SECTOR NUMBER | - - - - - - - - |
| CYLINDER LOW | - - - - - - - - |
| CYLINDER HIGH | - - - - - - - - |
| DEVICE/ HEAD | 1 L 1 D - - - - |
| COMMAND | 1 1 1 1 1 0 1 1 |

FIG. 12

| COMMAND BLOCK OUTPUT REGISTERS | |
|---|---|
| REGISTER | 7 6 5 4 3 2 1 0 |
| DATA | - - - - - - - - |
| ERROR | - - - - - - - - |
| SECTOR COUNT | - - - - - - - - |
| SECTOR NUMBER | V V V V V V V V |
| CYLINDER LOW | V V V V V V V V |
| CYLINDER HIGH | V V V V V V V V |
| DEVICE/ HEAD | - - - - H H H H |
| COMMAND | |

FIG. 13

HPA PARAMETER TABLE 1600

| | |
|---|---|
| PHYSICAL DRIVE | 1602 |
| NUMBER OF SECTORS | 1604 |
| START LOCATION OF SECTORS | 1606 |
| TARGET MEMORY ADDRESS | 1608 |
| STATUS CODE INFORMATION | 1610 |
| TABLE LENGTH | 1612 |
| TABLE REVISION | 1614 |
| CHECKSUM | 1616 |

FIG. 16A

HPA INFORMATION TABLE 1650

| | |
|---|---|
| SIGNATURED VALUE | 1652 |
| SMI PORT ADDRESS | 1654 |
| SMI COMMAND VALUE | 1656 |
| MAXIMUM NUMBER OF SECTORS | 1658 |
| LOCATION OF READ HPA PARA TABLE | 1660 |
| FIRST READABLE SECTOR | 1662 |
| NUMBER OF FIRST GROUP SECTORS | 1664 |
| TABLE LENGTH | 1666 |
| TABLE REVISION | 1668 |
| CHECKSUM | 1670 |

FIG. 16B

METHOD AND SYSTEM FOR CHANGING SOFTWARE ACCESS LEVEL WITHIN OR OUTSIDE A HOST PROTECTED AREA

FIELD OF THE INVENTION

The present invention generally relates to the field of data storage devices, and particularly to a method and system for setting software access levels within mass storage device media.

BACKGROUND OF THE INVENTION

Host BIOS (Basic Input/Output System) is the software embedded on a chip that is a component of an information handling system and is located on the information handling system's motherboard (i.e., system board). After an information handling system is started (i.e., power is applied or a system has been reset), host BIOS becomes the software entity that has initial system control. The host BIOS executes routines that test and initialize the system components and ultimately loads (boots) an OS (operating system). Loading (or booting) an OS is an example of host BIOS passing system control to another software entity (the OS). After boot, a host BIOS may relinquish complete system control but continue to provide run-time software services which provide software support for various devices and features. After relinquishing complete system control, host BIOS may regain system control by invocation of host BIOS runtime services by other software. However, BIOS control during execution of normal runtime services can be preempted by other software. Invocation of special runtime service provided via a special SMI command will allow host BIOS to regain complete system control.

Currently, computer users have to store and retrieve physical diskettes or CD-ROMs to install various software applications programs, such as restoration programs and device drivers, and files required by the programs and drivers. The diskettes tend to become lost. The use of diskettes increases maintenance and development because of the time and effort spent in storing, retrieving, installing, and uninstalling the physical diskettes. Portability is also reduced since the physical diskettes must be moved along with the computer system.

Placing restoration files, drivers, and similar software applications programs on the hard drive is a possible solution. These files cannot be placed in a hard disk area that is accessible to write operations by general software entities because of possible data corruption. It may be possible to store these files in a password protected area of the mass storage device through a password only known to host BIOS (basic input output system) or other software that initially has control after a software reset. However, any method that allows the BIOS to provide password information to an application, an operating system (OS), or another software entity, may compromise the security of the password protected area making it vulnerable to viruses and other alterations.

Therefore, it would be desirable to provide a secure method for allowing read only access to a hard drive or other mass storage device.

SUMMARY OF THE INVENTION

Accordingly, the present invention is directed to a method and system for changing software access level within a hard drive or other mass storage media, especially, the creation of read only areas.

In a first aspect of the present invention, a method for setting an accessibility level of a portion of mass storage device media by software other than host BIOS code includes steps for partitioning mass storage device media into a first part that is accessed through the host BIOS code only and a second part that is accessed by all software including host BIOS code. One of the first and second parts of mass storage device media is further partitioned to create a changed accessibility area for the software other than host BIOS code within one of the first and second parts.

In a second aspect of the present invention, an information handling system has mass storage media partitioned into different access levels. Host BIOS code and the mass storage device media controller code communicate to determine the access levels and the boundaries of the different areas of partitioned media. A first portion of the mass storage device media is not directly accessible by software other than host BIOS code while a second portion of the mass storage device media is accessible by all software. At least one of the first and second portions is effectively further partitioned to establish two or more areas of different accessibility levels by software.

The present invention allows secure hard drive support for read only partitions, read only CD-ROM emulation, and other READ ONLY hard drive access requirements. Exemplary applications of the present invention include the retrieval from hard drive storage of restoration and driver software.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 8 illustrates an embodiment of a READ NATIVE MAX ADDRESS command;

FIG. 9 illustrates an embodiment of a STATUS response to a READ NATIVE MAX ADDRESS command;

FIG. 10 illustrates an embodiment of a SET MAX SET NON-HPA MAX ADDRESS command;

FIG. 11 illustrates an embodiment of a SET MAX SET READMAX ADDRESS command;

FIG. 12 illustrates an embodiment of a SET MAX SET WRITEMAX ADDRESS command;

FIG. 13 illustrates an embodiment of a STATUS response to a SET MAX SET NON-HPA MAX ADDRESS command;

FIG. 16A illustrates an embodiment of a Host Protected Area Parameter Table of the present invention;

FIG. 16B illustrates an embodiment of a Host Protected Area Information Table of the present invention;

DETAILED DESCRIPTION OF THE INVENTION

Figure 1A:
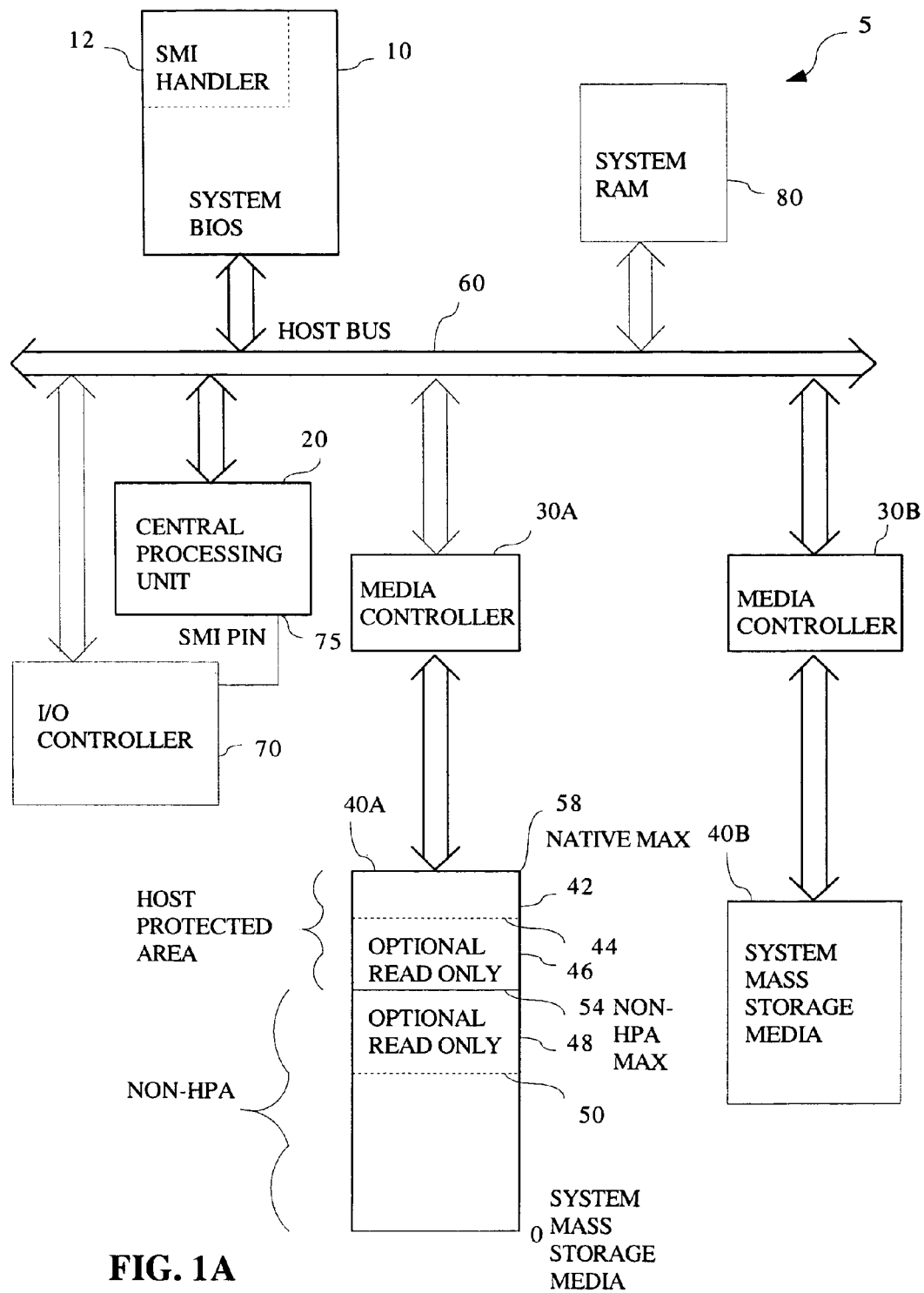
FIG. 1A illustrates an embodiment of an information handling system of the present invention.

Reference will now be made in detail to the presently preferred embodiments of the invention, examples of which are illustrated in the accompanying drawings.

The present invention relates to a method and system for dividing a mass storage device media into a portion directly accessible by an operating system (OS) (e.g., DOS, Windows, Unix, Linux, and the like) or other software entities and a portion inaccessible to all other software except, perhaps, the host BIOS (Basic Input Output System). The portion normally inaccessible by the OS and other software entities is a reserve area or host protected area (HPA). Mass storage device HPA support allows host BIOS code (which may be implemented as firmware in a separate device or as part of another device—especially in a BIOS dedicated integrated circuit chip) to reserve a top down area on a hard drive of any size equal to or less than the total drive capacity. During normal system operation, the operating system is not loaded from an HPA bootable service. Host (or motherboard) BIOS code will establish and/or protect the HPA prior to passing software control to any other software entity. Because host BIOS code is the first software entity that controls the system upon a power cycle, host BIOS code is preferably used to set up the HPA. Host BIOS accesses a predesignated area on a hard drive that provides a header structure describing boundaries of the HPA. The header structure may correspond to a table format, as per the T13 committee 1367D Revision 3 Boot Engineer Extension record, herein incorporated by reference in the entirety. The HPA is divided into service areas. During normal operation, the HPA can not be accessed by an OS (operating system), by applications launched by that OS, or by any other software entity that does not have knowledge of the password.

The host protected area is established by a command (or set of commands) supported by a mass storage device's control logic and may add to a preexisting reserve area or may establish a new reserve area. Basically, these commands control the geography of the HPA and protection levels. The HPA may be accessible by the host BIOS up to and including a logical maximum sector (or other memory unit). The HPA may be thought of as an area of mass storage media that is to be protected from access by software other than host BIOS code. Access to the HPA has been limited to host BIOS code that involves the use of an internal password that is set by the host BIOS code when setting the HPA. To ensure total security for the HPA, host BIOS code does not provide knowledge of the password to any other software entity. Host BIOS may unlock the HPA (i.e., temporarily change the HPA boundaries, thus allowing access to data residing within the original HPA boundaries) to effectively permit data transfer to or from the HPA. BIOS or other software issue read and write commands to a hard drive in either Programmed Input/Output (PIO) or Direct Memory Access (DMA) mode. In a PIO mode read, the target device (i.e., the hard drive) returns data via an Input/Output (IO) port (the device's data output port). In a PIO mode write, the target device accepts and stores data written to an IO port (the device's data input port). In DMA mode data is transferred directly from system memory (typically system RAM) to the device (DMA write) or from the device to memory (DMA read). The HPA is especially useful to support bootable services within that HPA. A bootable HPA service may access the entire drive and may launch system diagnostics, operating system restoration procedures, etc., which are protected from corruption and contamination during normal system use.

Special host BIOS procedures for accessing the HPA may allow secure access or temporarily unprotected access of the mass storage device media for READ ONLY partitions, READ ONLY CD-ROM emulation, and other READ ONLY media access requirements. The present invention also relates to a method and system for reducing or otherwise changing the accessibility of software in a part of the portion directly accessible by the software. The division of mass storage media between HPA and non-HPA may be defined variously as non-user and user, non-OS accessible and OS accessible, host BIOS code accessible and all software entity accessible, etc., according to the needs and desires of the manufacturer or end user.

Figure 1B:
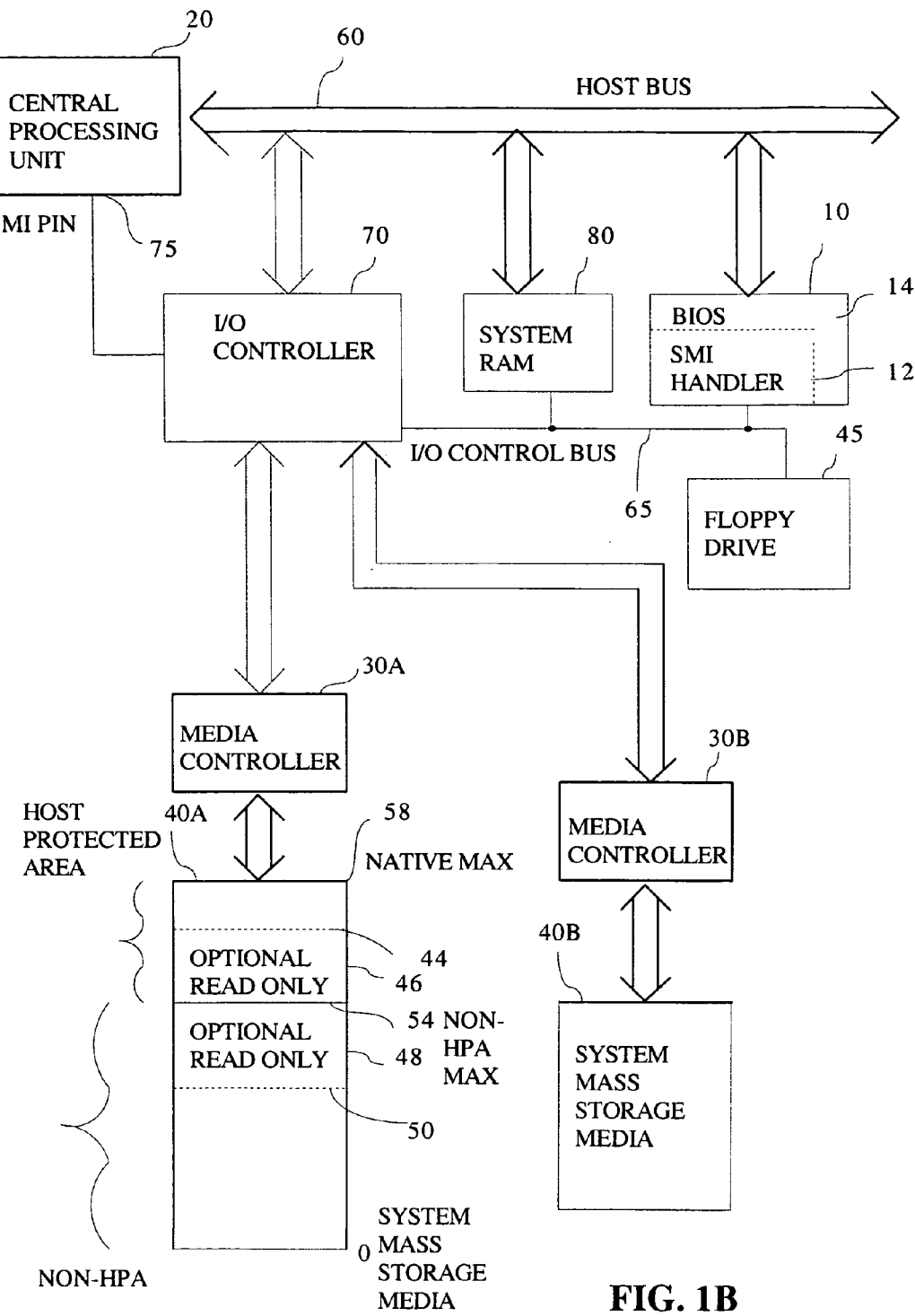
FIG. 1B illustrates another embodiment of an information handling system of the present invention.

FIGS. 1A and 1B illustrate exemplary embodiments of a system of the present invention. A central processing unit (CPU) 20 may load an applications program's executable code into system RAM 80 from mass storage devices and execute the executable code from the system RAM 80. A mass storage device includes control logic 30A and storage media 40A. There may be one, two, several, or many mass storage devices communicatively coupled to the CPU 20. System mass storage media 40A or 40B is preferably high capacity device storage (i.e., mass storage device media) such as a hard disk, floppy disk, writeable CD-ROM, writeable DVD-ROM, high density floppy, high capacity removable media, a solid state memory device, tape, etc., and, preferably, a large capacity hard drive compliant with the Advanced Technology Attachment (ATA) 5 (or 6) specification or the Small Computer System Interface (SCSI) specification. The method may be practiced with memory and media other than mass storage media. A high capacity hard drive's control logic (or media controller) 30A or 30B and system mass storage media 40A or 40B may be implemented in a single hard drive housing as drive control logic and storage media. The media controller 30A, 30B allows a write to or read from the non-host-protected-area (NON-HPA) of respective mass storage media 40A, 40B. System RAM 80 and I/O controller 70 are also communicatively attached to the host bus 60. When asserted, a system Management Interrupt (SMI) pin 75 on CPU 20 allows Intel compatible System Management Mode. The System Management Mode is a special mode of a CPU to permit host BIOS to regain complete system control. Security is provided because hacking the software that executes in System Management Mode (via a System Management Interrupt handler) requires expensive processor in-line emulation hardware. Through special procedures involving special commands to host BIOS code 10, the CPU 20 may also access the host protected area (HPA) of mass storage media 40A. Preferably, for a hard drive system, the HPA is located in the primary hard drive. The host protected area may be used to store virus scan instructions, instructions to predict a disk drive failure, a portion of a host BIOS start up/reset initialization code, emergency boot instructions, and the like. The virus scan instructions may allow for periodic scanning of a hard drive for viruses or may allow for scanning information to be written on a disk before the information is stored to the disk. Alternatively, the HPA may be partitioned to permit indirect access by applications programs that issue a special host BIOS supported command via an I/O controller 70 supported command that asserts the CPU's SMI pin 75. SMI assertion will immediately transfer software control to the host BIOS' System Management Interrupt handler 12 (especially for Intel I/O chip sets) or functionally similar process. For instance, the HPA may have a read only area 46. Preferably, write access to read only area 46 is achieved only through the use of a password stored by the host BIOS 10 to which the OS lacks access. This password may be generated uniquely by the host BIOS each time the information handling system 5 is powered up and reset. The system mass storage media accessible by software may also be partitioned to form a limited access area, such as a read only area 48 outside of the HPA. Aside from using a drive supported expanded command set, a BIOS supported expanded command set may be used in which the BIOS 10 may provide a service that allows indirect software read access in which the host BIOS' SMI handlers actually initiates the read (such a method is supported by a CPU 20 that support Intel compatible processor System Management Mode). The BIOS may also support temporarily unprotecting the HPA. In FIG. 1B, the mass storage devices interface with the I/O controller 70. An I/O control bus 65 interconnects the I/O controller 70, the system RAM 80, the host BIOS 10, and a floppy drive 45.

The present invention is further described in FIGS. 2–19. First, the embodiment of FIGS. 2–13 defines a method to allow a computer system manufacturer to modify the size of the HPA, set accessibility levels within the HPA, and set accessibility levels outside the HPA using an expanded ATA command set. Second, the System Management Interrupt Method is illustrated by FIGS. 14–17. In the SMI method, a READ HPA SMI command may be enabled by a password issued by a SET MAX SET PASSWORD command, set up between the disk drive manufacturer and the computer system manufacturer, or otherwise established. The password typically is set in response to a command (e.g., a SET MAX SET PASSWORD command) and typically means nothing to the disk drive other than to allow execution of certain commands as discussed below. The SMI Method introduces a READONLY feature that requires the host BIOS to password protect the commands that allow HPA access. The HPA and READ ONLY drive areas, once established, may be left unalterable until a power cycle at which time host BIOS code may simply reestablish and protect those boundaries. Third, FIGS. 18 and 19 illustrate the temporarily unprotected service method. The temporarily unprotected service method is less secure method than the SMI Method as the temporarily unprotected service method temporarily exposes a portion of the HPA without password protection. The temporarily unprotected service method or SMI method may be used where the drive does not support the features that allow establishing a secure READ ONLY area. Other variations are contemplated by the present invention.

Figure 2:
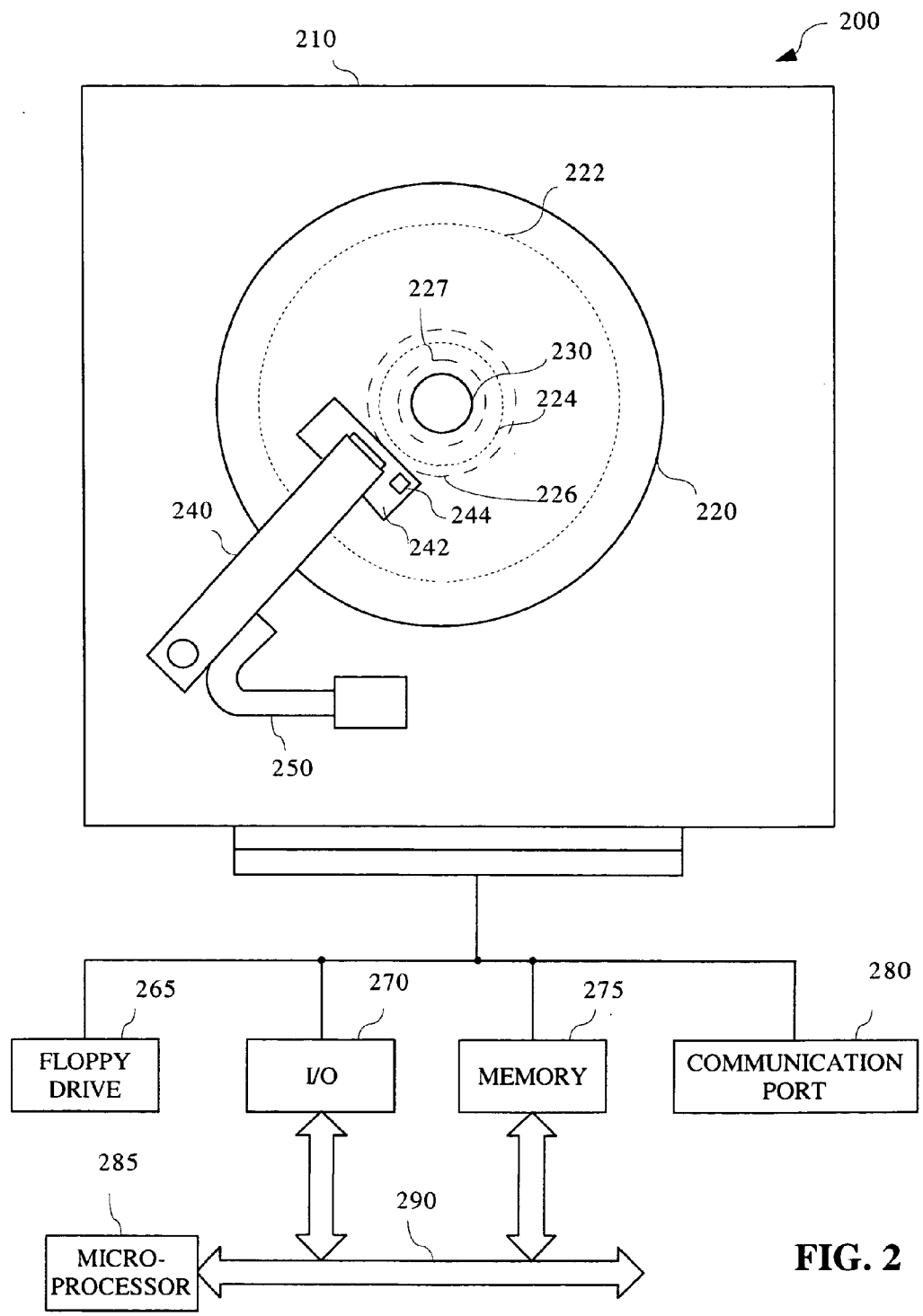
FIG. 2 illustrates an embodiment of an information handling system with a hard drive system in the present invention.

FIGS. 2–13 illustrate an embodiment of a system and a method of the present invention using an expanded command set for a hard drive. The hardware-supported method preferably establishes READ ONLY support within or outside an HPA and may also be used to generate various WRITE ONLY, READ ONLY, READ/WRITE, password protected, unsecured, and/or inaccessible areas on the hard drive. Preferably, the expanded command set method permits WRITE accesses of the READ ONLY areas with a password. HPAs used in hard drives are described further in U.S. Pat. No. 5,966,732, herein incorporated by reference in the entirety. Although HPAs preferably are created upon or shortly after a system start up/reset, through host BIOS code, an HPA may be created at another time, through software code automatically or by user manual input prompted by software code. In FIG. 2, an information handling or computer system 200 includes a disk drive 210. The computer system 200 also includes a microprocessor 285 having a data, address, and instruction bus 290 for passing commands and data. A memory 275 and an input/output controller 270 are attached to the data and instruction bus 290. Attached to the input/output controller 270 are a floppy drive 265, a communications port 280 and a disk drive 210. The disk drive 210 shown is a hard or rigid disk drive. The rigid disk drive includes a housing that typically includes a base plate and a cover that form a controlled environment called a disk enclosure. A spindle 230 is attached to the housing. Attached to the spindle 230 is a rigid disk 220. The spindle 230 is capable of rotation and rotates the disk 220 during operation. Also attached to the housing is an actuator arm 240. In FIG. 2, the actuator arm is shown as rotatably attached to the housing, however, an actuator arm can also be attached to the housing so that linear motion is achieved. Attached at the end of the actuator arm 240 is a slider 242 that carries a transducer 244. The slider 242 passes over the disk 220 and places the transducer in an energy conversion relationship to the disk 220. The disk 220 includes a multiplicity of tracks that are typically invisible to the naked eye. The actuator arm 240 is moved and controlled to place the transducer 244 over a particular desired track and then maintain the transducer 244 over the desired track until desired information is read from or written to the desired track. In the case of reading information from the track on the disk 220, the transducer is electrically connected to circuitry 250 for amplifying the signal, decoding the signal and transferring the signal to a connector. The electrical circuitry typically includes a circuit board that contains processing circuitry, firmware, and other hardware.

Figure 3:
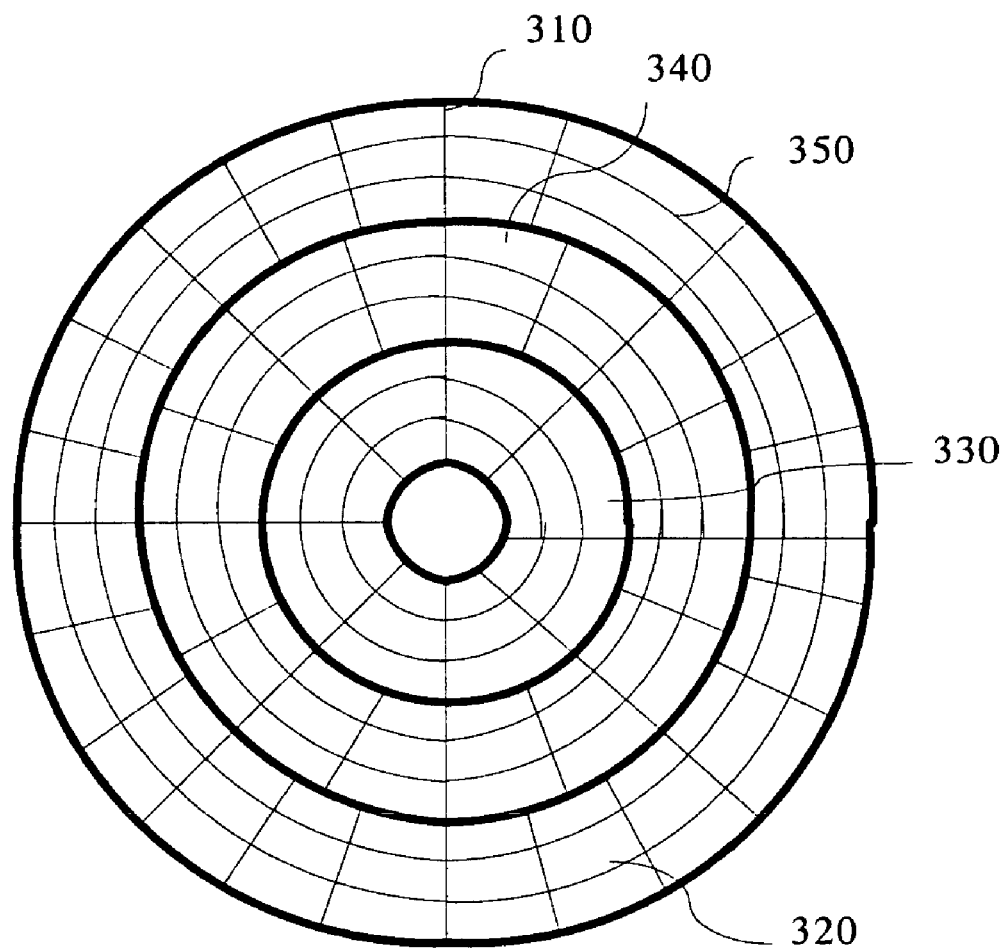
FIG. 3 illustrates hard disk sectors in the embodiment of FIG. 2.

An inner track 226 and an outer track 222 are shown as dotted concentric circles on the disk in FIG. 2. The tracks located between the inner track 226 and the outer track 222 represent an area of the disk to which a user has access. The outer track is numbered track zero (track 0). The tracks are then numbered consecutively so that the higher numbered tracks are located closer to the center of the disk 220. It should be noted that when a disk drive contains more than one disk, the tracks that share the same number are at about the same distance from the center of the spindle. The tracks having the same number are then said to form a cylinder. Track zones and sectors of hard drive 310 are illustrated in FIG. 3. Tracks in each zone 330, 340, 350 have the same number of sectors 320 per track. The term "sector" refers to a minimum transfer block size for most mass storage device classes (e.g., hard drives, CD-ROMs, floppy drives). The size of a sector is typically 512 bytes, but may vary. Tracks in zones 330 closer to the center (i.e., spindle) have fewer sectors per track than tracks farther from the center.

An HPA may be located anywhere on the disk 220, but most commonly is located toward the center diameter of the disk inside of the innermost track. Accordingly, the HPA is shown inside the inner track 226 on the disk 220. The reason that this is the most common portion of the disk on which to have a HPA is that these tracks hold the least amount of information per track. Since the inner tracks hold less data or information per track, they are also in smaller increments. The computer manufacturer may determine the size of the HPA. The capacity of all the added tracks for the HPA will have to be equal to or greater than the size of data to be stored in the HPA. Typically, the computer system manufacturer will add tracks until the amount of storage capacity exceeds the size of the data to be stored. It should be noted that the tracks capable of holding more data are more valuable in terms of storage available to the user. The tracks capable of holding more data also occur in larger increments. If an additional track is needed to provide enough capacity to meet the capacity desired to be added to the new HPA, using the tracks having smaller capacity will waste less capacity otherwise available for the user.

Further refinement in disk access may be achieved by delimiting read and/or write operations. A separate command may set a maximum read track 227 within the HPA. Similarly, a command may set a maximum write track 224 below the HPA. Various configurations of disk accessibility are contemplated by the present invention, including setting the maximum write track within the HPA, setting the maximum write track greater than the maximum read track, and setting the maximum read track outside the HPA.

Generally, a command format may be thought of as having a command code and one or more operands. The command may comprise a single word of 8, 16, 32, or 64 bits or may include two or more 8, 16, 32, or 64 bit words. For example, one word may contain the operation code and each additional word may correspond to an operand, analogous to an argument of a function or subroutine. Certain bit fields within a media location may correspond to the operation code and other bit fields within the same media location may correspond to the operands. The command may also be implemented through predesignated registers or tables. Preferably, several 8-bit registers are used to store individual operands and a single 8-bit register is used to store the operation code. Operand information may include type or sub-type of operation, media location, number of media locations to be read, media identification information, status information, error information, and the like. A media location may be defined as an absolute address, a relative address, or otherwise. In the case of a hard drive, the media location may be defined as head number, cylinder, and sector identification or as a logical block address (LBA).

Figure 4:
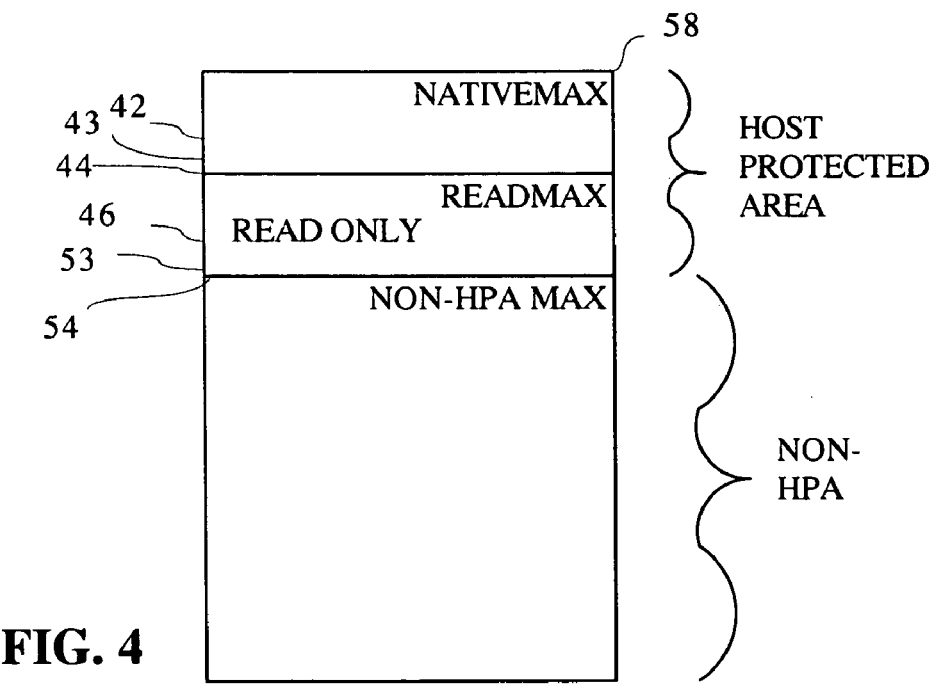
FIG. 4 illustrates a first embodiment of a partitioning of system mass storage media in the present invention.

FIG. 4 illustrates an embodiment in which a mass storage device supports an expandable READ ONLY area 46 within the HPA of a hard drive through a SET MAX SET READ-MAX ADDRESS command or other technique. NATIVE-MAX 58 represents the maximum sector or the maximum physical LBA of the hard drive (i.e., the end of the mass storage device media). Similarly, READMAX 44 represents the maximum sector that may be read by a software entity and NON-HPA MAX 54 represents the maximum sector that may be directly accessed by software other than host BIOS code. A SET MAX SET READMAX ADDRESS command establishes the upper readable boundary of system mass storage media, including system mass storage media not directly accessible by software other than host BIOS code. A READMAX value 44 that is greater than the NON-HPA MAX value 54 establishes a READ ONLY area within an HPA of size representing the difference between READ-MAX and NON-HPA MAX. If an operating system issues a command similar to the ATA specification defined IDENTIFY DEVICE command in order to determine maximum drive capacity, the operating system will not be able to determine that the HPA exists. However, a system maintenance application or any other software that is aware of the existence and structure of the HPA is able to access data from the READ ONLY HPA area. Although the OS may be able to read the Read Only HPA sectors, the OS rarely will do so. Implementing an HPA without a READ ONLY area requires that READMAX be equal to NON-HPA MAX. If READMAX is less than NON-HPA MAX, a WRITE ONLY area is established below the HPA that any software may over write, but will not be able to read. The value READ-MAX+1 43 represents the first sector of a hard drive that is accessible by host BIOS code only. The value NON-HPA MAX+1 53 represents the start sector of the HPA.

Figure 5:
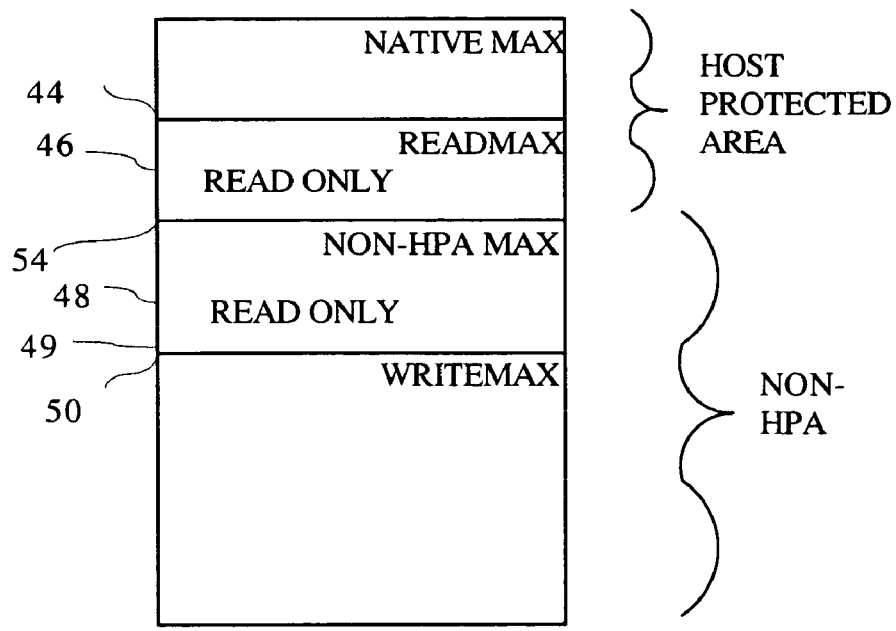
FIG. 5 illustrates a second embodiment of a partitioning of system mass storage media in the present invention.

FIG. 5 illustrates an embodiment in which a mass storage device also supports a SET MAX SET WRITEMAX ADDRESS command especially for establishing a READ ONLY area below an HPA of a hard drive. READMAX 44 and WRITEMAX 50 may completely control LBA readability and writeability. As shown in FIG. 5, NON-HPA MAX and WRITEMAX have been set to establish a READ ONLY area that does not reside in the HPA. If WRITEMAX is less than NON-HPA MAX, a READ ONLY area is created below the HPA, which is read accessible to all software. If WRITEMAX 54 is equal to NON-HPA MAX 50, the existence of a READ ONLY area below the HPA is prevented. Setting WRITEMAX greater than NON-HPA MAX defines a writeable area within the HPA. If a READ ONLY area within an HPA is not required, READMAX may be set equal to NON-HPA MAX. LBAs from WRITEMAX+1 49 through NON-HPA MAX, are READ ONLY, but are not part of the HPA. Since any software may be able to determine the NON-HPA MAX value, an operating system can detect the non-HPA READ ONLY area.

Figure 6:
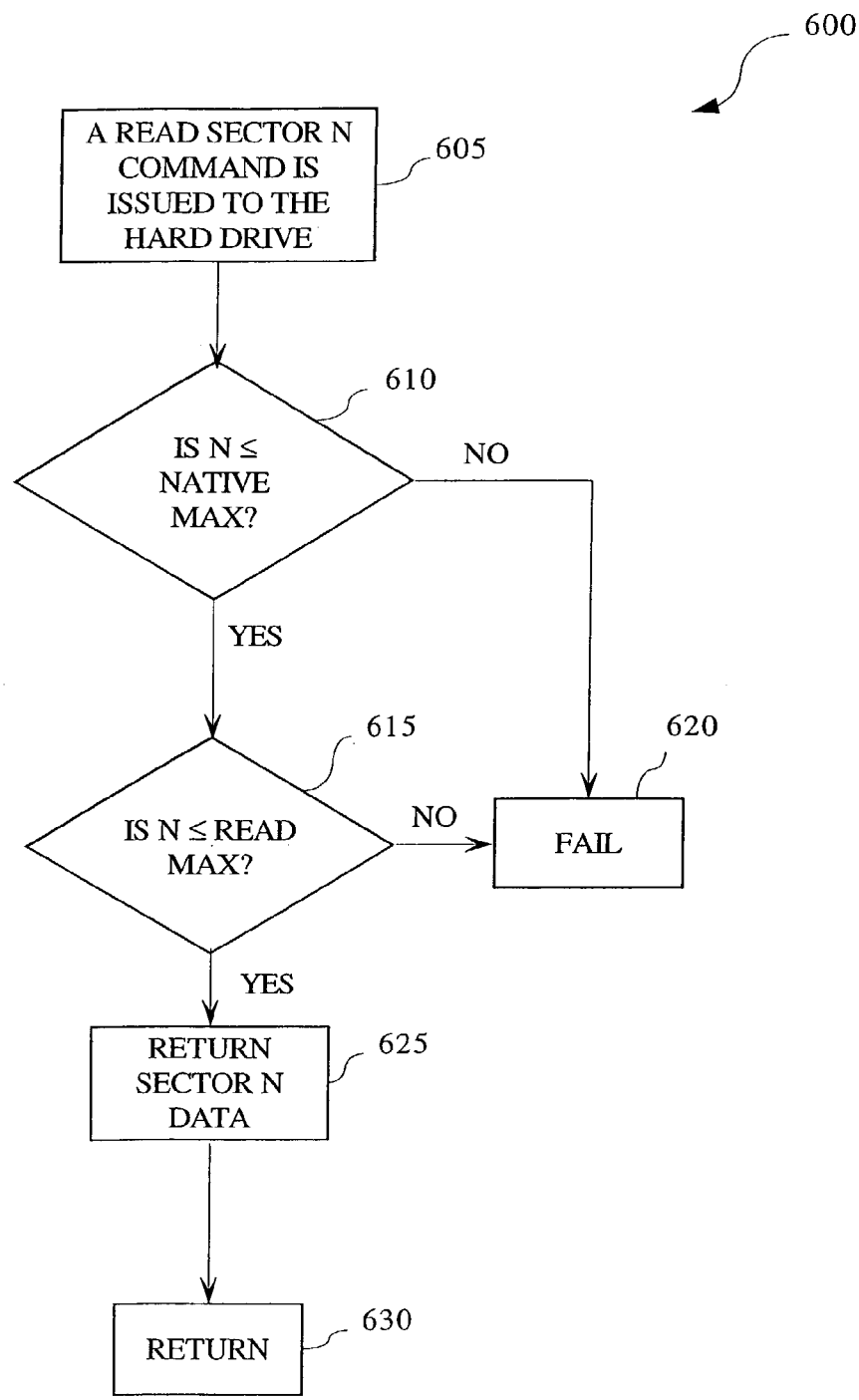
FIG. 6 illustrates an embodiment of a method for reading a hard drive using the expanded ATA command set.

FIG. 6 illustrates an exemplary read operation 600 using the expanded ATA command set of the present invention. An ATA defined Read Sector N command is issued to the hard drive 605. The sector to be read (e.g., N) is a command parameter. The hard drive controller determines if N is less than or equal to both NATIVEMAX 610 and READMAX 615. If N is not less than or equal to both values, the read operation fails 620. Otherwise, the hard drive controller returns sector N date from the hard drive 625, 630.

Figure 7:
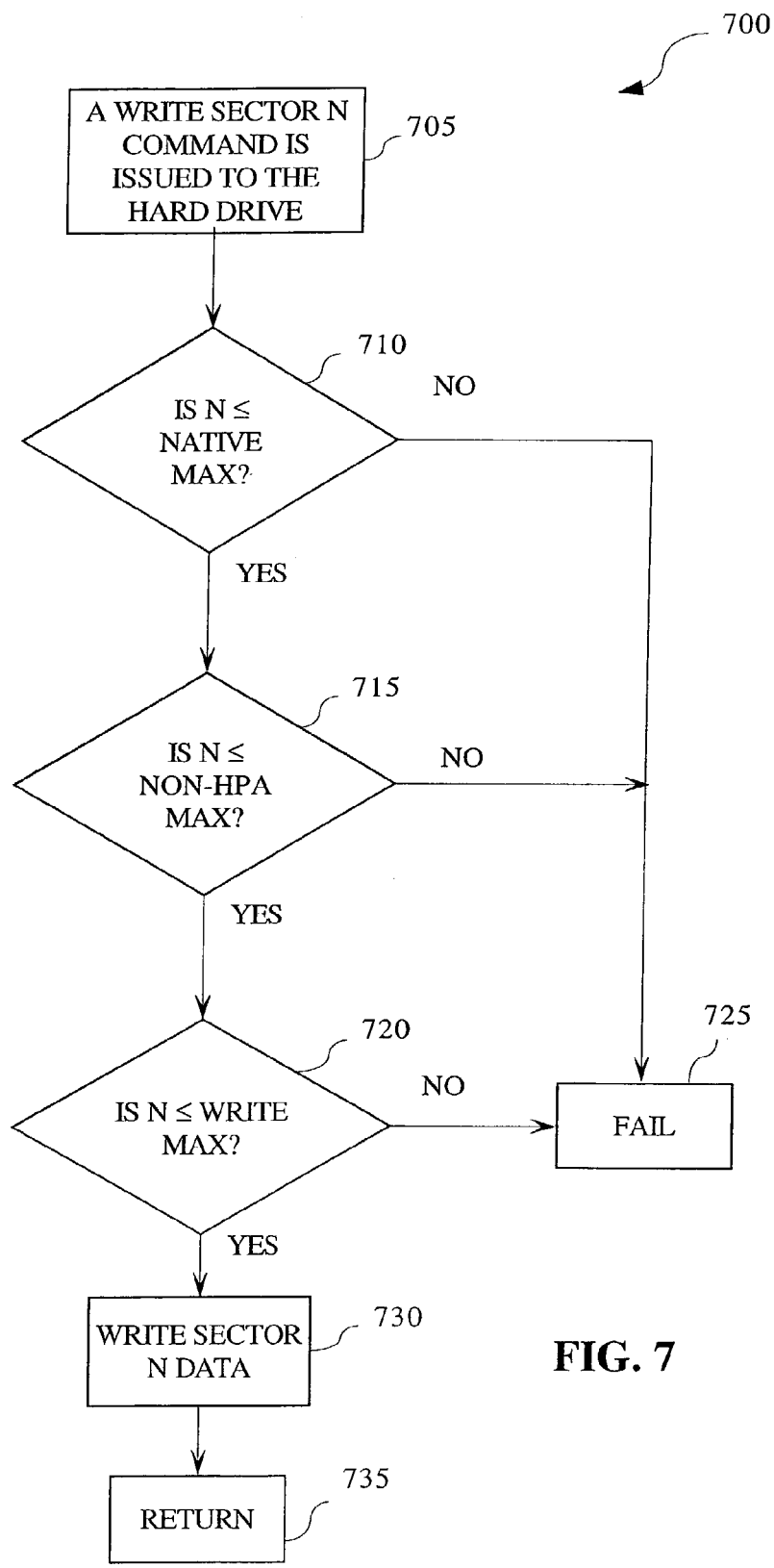
FIG. 7 illustrates an embodiment of a method for writing to a hard drive using the expanded ATA command set.

FIG. 7 illustrates an exemplary write operation 700 using the expanded ATA command set of the present invention. A Write Sector N command is issued to the hard drive 705. The hard drive controller may determine if N is less or equal to all of NATIVEMAX, NON-HPA MAX, and WRITEMAX 710, 715, and 720. If not, the write operation fails 725. Otherwise, the data is written to sector N on the hard drive 730, 735. A variation of this method eliminates the comparison of N to NON-HPA MAX to permit a writeable area within the HPA.

FIGS. 8–13 describe certain commands of a hard drive controller command set, especially for the ATA specification. The command set may be implemented to include READ NATIVEMAX, SET MAX SET NON-HPA MAX ADDRESS, SET MAX SET READMAX ADDRESS, and SET MAX SET WRITEMAX ADDRESS commands. The READ NATIVEMAX ADDRESS command allows the host to determine the maximum native address space of the media even when a host protected area has been allocated.

The SET MAX SET NON-HPA MAX ADDRESS command is the command that requests a new or different maximum cylinder or logical block address to establish NON-HPA MAX. In other words, this is the command that resets the boundary between the user accessible area and the reserve area or negative cylinders to which the user does not have access. In addition to the SET MAX SET NON-HPA MAX ADDRESS command, SET MAX SET READ MAX ADDRESS and SET MAX SET WRITE MAX ADDRESS commands may be used to further establish accessibility boundaries. When a SET MAX SET NON-HPA MAX ADDRESS command is issued, WRITEMAX and READMAX are set to the value of NON-HPA MAX. Then, SET MAX SET WRITE MAX ADDRESS and/or SET MAX SET READ MAX ADDRESS commands may be issued to provide locations in the media that are distinct from NON-HPA MAX. In an alternative embodiment, if a SET MAX SET NON-HPA MAX ADDRESS command is issued, WRITEMAX and READMAX values may remain at a previously set value. A manufacturer may determine the SET MAX SET NON-HPA MAX ADDRESS, the SET MAX SET WRITE MAX ADDRESS, and the SET MAX SET READ MAX ADDRESS commands' effect to provide backwards compatibility with earlier versions of the command set. The SET MAX SET NON-HPA MAX ADDRESS command may effectively just control or may be defined as merely controlling the drive size value returned by the IDENTIFY DEVICE command. Host BIOS can neither write access hard drive sectors above the logical maximum sector set via the SET MAX SET WRITE MAX ADDRESS command nor read access hard drive sectors above the logical maximum sector set via the SET MAX SET READ MAX ADDRESS command, unless host BIOS has access to an internally generated password. Generally, host BIOS physically protects the designated HPA area prior to passing control to another software entity. As an exception, the SET MAX SET NON-HPA MAX ADDRESS command would not have been issued prior to passing control to (booting) an HPA Service. As long as the HPA service is designed not to allow passing control to software that would compromise the designated HPA that service is effectively an extension of the host BIOS.

A variety of SET MAX commands may be implemented using the hard drive's control logic. The ATA specification (an industry standard), herein incorporated by reference in the entirety, has defined other applicable commands. READ NATIVEMAX ADDRESS allows the host to determine the maximum native address space of the device even when a protected area has been allocated. SET MAX LOCK may prohibit alteration of the boundary between the direct control of the user (or, general software entities) and non-user (or, host BIOS code) control of the system mass storage media. SET MAX LOCK allows the host to disable the SET MAX commands (except SET MAX UNLOCK) until the next power cycle or the issuance and acceptance of the SET MAX UNLOCK command. When this command is accepted, the device is in the SET_MAX_LOCKED mode. SET MAX UNLOCK may permit software to change the location of the boundary between host BIOS directly accessible media and non-host BIOS code accessible media (i.e., the HPA). SET MAX UNLOCK changes the device from the SET_MAX_LOCKED mode to the SET_MAX_UN-LOCKED mode. The SET MAX SET PASSWORD command allows the host BIOS to set a new internal password. The host BIOS must not allow the password to be exposed to any other software entity. The HPA area appears when the SET MAX SET NON-HPA MAX ADDRESS command sets the Logical Drive size to a value smaller than the NATIVE-MAX size. However, the HPA area is not yet secure. Software may still issue another SET MAX SET NON-HPA MAX ADDRESS command to set the logical size to a different value including equal to NATIVEMAX. The SET MAX SET PASSWORD command allows protecting the SET MAX command set. The software entity directly accessible media may be considered unprotected. SET MAX FREEZE LOCK allows the host to disable the SET MAX commands (including SET MAX UNLOCK) until the next power cycle. When this command is accepted, the device is in the SET_MAX_FROZEN mode. The SET_MAX_FROZEN mode may be used in a Freeze Lock method that allows setting and securing an HPA until the next power cycle. A SET MAX LOCK command must be issued and secured via a SET MAX SET PASSWORD or a SET MAX FREEZE LOCK command issued to prevent unwanted setting of the password in a password method that allows setting and securing an HPA, but allows a software entity with knowledge of the password to reestablish the HPA boundaries. The SET MAX LOCKED state may be secured if a SET MAX SET PASSWORD command has been issued. A software entity that does not have knowledge of the password is then prevented from successfully issuing a SET MAX UNLOCK command. The SET MAX SET READMAX ADDRESS command determines the last location in the disk drive that may be read by a software entity. The SET MAX SET WRITEMAX ADDRESS command determines the last location in the disk drive that may be written to by a software entity.

These commands and the responses thereto are, preferably, in a format specifically required for a drive that operates with a standard Integrated Drive Electronics (IDE) interface or a Universal Serial Bus (USB) ATA device. Specifically, these commands are known as ATA commands. One of ordinary skill in the art could adapt these commands to use other industry standard interfaces such as Small Computer System Interface (SCSI), SCSI II, EIDE, IPI, ESDI, SMD, ST506 RLL, or ST506. The present invention may be implemented with a Redundant Array of Independent Disks (RAID). The ATA command format is set forth here merely as an illustrative example with respect to other formats.

In the FIGS. 8–13, certain parameter notations have been used. B is an option bit for a volatile condition (1) or a non-volatile condition (0). V indicates a valid bit; that is, a bit that should be specified as part of an output parameter.— indicates that the bit is not used. L indicates an addressing mode (1=LBA, 0=CHS). Further descriptions are provided by U.S. Pat. No. 5,966,732, herein incorporated by reference in the entirety.

Communication to or from any ATA device, such as a disk drive, is through an I/O register that routes the input or output data to or from registers associated with the ATA command block. The Command Block Registers are used for sending commands to the device or posting status from the device. The Control Block Registers are used for device control and to post alternate status. The command block registers include ten, 8-bit registers. The ten registers are for DATA, FEATURE, SECTOR COUNT, SECTOR NUMBER, CYLINDER LOW, CYLINDER HIGH, DEVICE/HEAD, COMMAND, STATUS, and ERROR.

The hard drive commands for data transfer and status use ten 8-bit registers that form the hard drive (e.g., ATA)

command block. When writing a command to the device, the contents that have been written to the Data, Features, Sector Count, Sector Number, Cylinder Low, Cylinder High, and Device/Head registers are treated as parameters of the command that is written to the command register. Command processing begins when the command register is written with a command. All the registers, except the command register, act as parameters for the command. Basically, the parameters are set first and then the command is issued.

For the READ NATIVEMAX ADDRESS command, as shown in FIG. 8, the Data, Features, Sector Count, Sector Number, Cylinder Low, and Cylinder High registers are not used and therefore, do not need to be initialized. The command (F8h) is written to the Command register after first writing a value into the Device/Head register. The value written to the Device/Head register indicates which device should respond to the command and whether the NATIVE-MAX ADDRESS returned should be reported as an LBA (Logical Block Address) value or as a CHS (Cylinder-Head-Sector) value. The DEVICE/HEAD register defines which drive (slave or master) and the mode in which the drive operates (LBA mode is Logical Block Address Mode). All or part of the eight bits of the 8-bit COMMAND register may be used to specify the command.

The response to the READ NATIVEMAX ADDRESS command is in the format of any ATA command block that is a matrix of eight, 8-bit registers. Each 8-bit register is not used in the response to the READ NATIVEMAX ADDRESS command, as shown in FIG. 9. The command block for the response to the READ NATIVEMAX ADDRESS includes eight, 8-bit registers for DATA, ERROR, SECTOR COUNT, SECTOR NUMBER, CYLINDER LOW, CYLINDER HIGH, DEVICE/HEAD, and STATUS. The 8-bit registers for DATA, ERROR, SECTOR COUNT are not used in the response to the READ NATIVE-MAX ADDRESS command returned to the host. The host only reads the parameters from the 8-bit registers for the SECTOR NUMBER, CYLINDER LOW, and CYLINDER HIGH, and the last four bits of the DEVICE/HEAD register. The values are typically ones and zeroes that convey a particular Sector Number, a particular cylinder for Cylinder Low and a particular cylinder for Cylinder High and MAX HEAD Number. Once the NATIVE MAX ADDRESS parameters are obtained, the device or disk drive places the parameters into the eight bit registers for SECTOR NUMBER, CYLINDER HIGH, CYLINDER LOW, and DEVICE/HEAD. Once these parameters are in these registers, the status bit indicating that the command is complete and the direct memory access (DMA) is ready is then set. The host then reads the parameters from the registers.

Once the response to the READ NATIVEMAX ADDRESS command is received by the host, the host can issue the SET MAX SET NON-HPA MAX ADDRESS command to the disk drive. The SET MAX SET NON-HPA MAX ADDRESS command, shown in FIG. 10, overwrites the maximum logical block address or maximum cylinder of the disk drive to reset the drive capacity available to the user and increase or decrease the reserve space or the capacity unavailable to the user as long as the maximum cylinder is less than the native maximum cylinder. The software issuing the commands to the disk drive passes the command and the parameters. The disk drive return parameters always include an error code.

FIG. 11 illustrates a SET MAX SET READ MAX ADDRESS command and FIG. 12 illustrates a SET MAX SET WRITE MAX ADDRESS command. The 8-bit registers may be configured for these commands similarly to the configuration of the SET MAX SET NON-HPA MAX ADDRESS command. The COMMAND register may have a unique command identifier or value for each command. The command values may be as illustrated by FIGS. 11 and 12 or may be otherwise designated. Code may be provided in the media controller or elsewhere to process the command. The SET MAX SET READ MAX ADDRESS command, an addition to the current ATA defined command set (herein incorporated by reference), allows setting read only access within a SET MAX SET NON-HPA MAX ADDRESS protected HPA. The SET MAX SET WRITEMAX ADDRESS command may be used to establish read only access below the HPA. Alternatively, password protection may be required for read only access to the available portion of the HPA. The SET MAX SET WRITEMAX ADDRESS command may establish an upper boundary for write access (an upper writeable LBA boundary). The SET MAX SET READMAX ADDRESS command operand is READMAX. The SET MAX SET WRITEMAX ADDRESS command operand is WRITEMAX.

The returned parameters are set forth in the response to a SET MAX SET NON-HPA MAX ADDRESS command, as shown in FIG. 13. The response to a SET MAX SET NON-HPA MAX ADDRESS command is in the format of any ATA command block that is a matrix of eight, 8-bit registers. Bits in the DATA, ERROR, SECTOR COUNT registers are not used to set parameters for the response to the SET MAX SET NON-HPA MAX ADDRESS command and therefore are not initialized. The drive parameters are conveyed by bits in the SECTOR NUMBER, CYLINDER LOW, CYLINDER HIGH, and DEVICE/HEAD 8-bit registers. The bits in these 8-bit registers convey the parameters for a particular Sector Number, a particular cylinder for Cylinder Low and a particular cylinder for Cylinder High. The bits of the DEVICE/HEAD register are used to convey parameters about the type of drive (slave or master) and the mode in which the drive operates (e.g., LBA mode).

Although the method of the present invention has been disclosed as being practiced as a top down approach, the method of the present invention may also be practiced as a bottom up approach. That is, rather than having NATIVE-MAX establish an upper limit of the HPA, sector 0 or the first logical block may establish a lower limit of the HPA. This approach may require that the drive have additional translation support. Other commands contemplated by the present invention include SET MIN ADDRESS, SET MIN READMIN ADDRESS, and SET MIN WRITEMIN ADDRESS.

Figure 14:
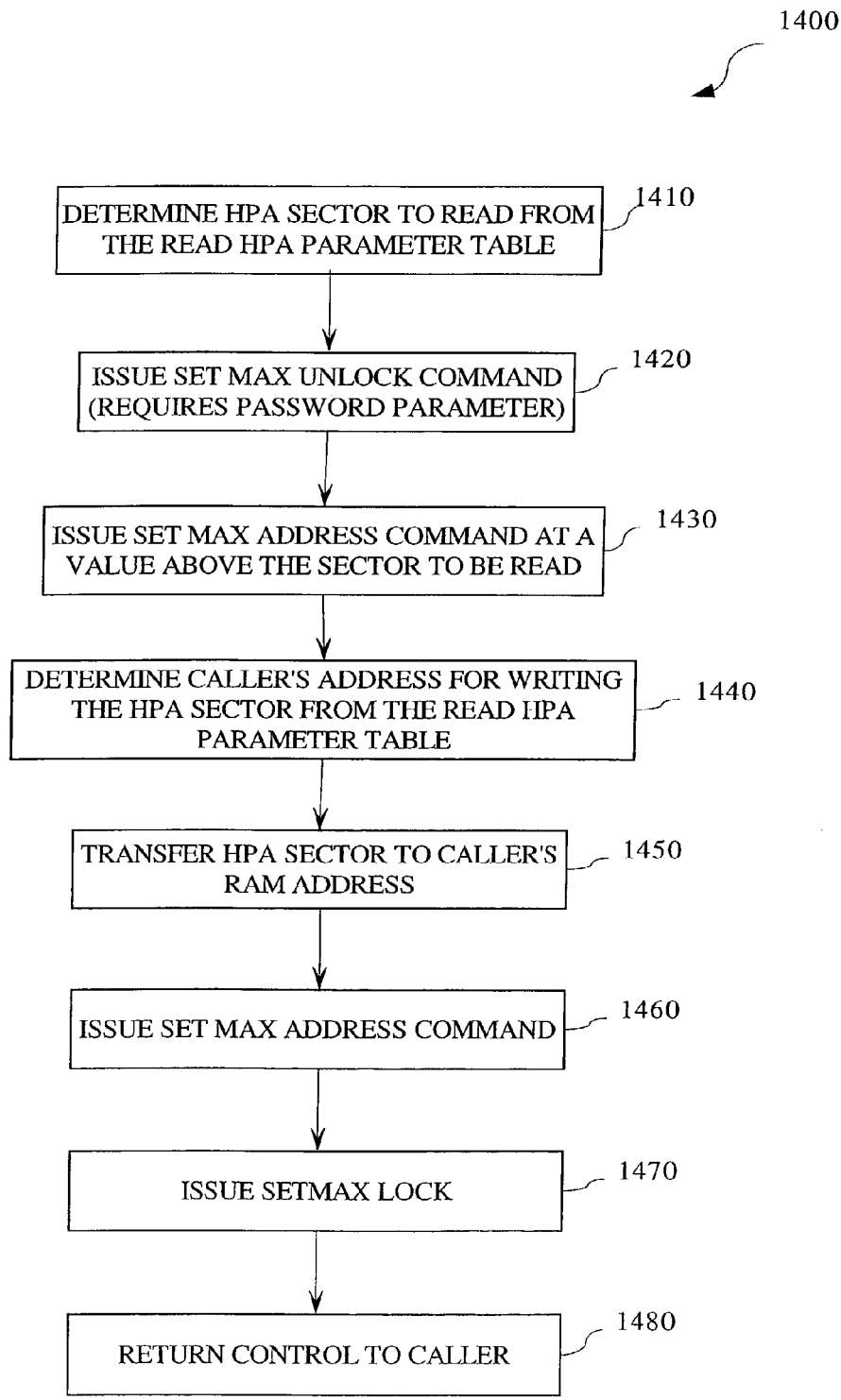
FIG. 14 illustrates a flow chart for an embodiment of the System Management Interrupt (SMI) method.

As an alternative to the expanded ATA command set method, the System Management Interrupt method (SMI method) or the temporarily unprotected service method may be used. The SMI method defines a command issued by the software to the host BIOS. In one embodiment, the SMI method may also use ATA commands such as SET MAX SET NON-HPA MAX ADDRESS, SET MAX UNLOCK, SET MAX LOCK, and SET MAX SET PASSWORD. An embodiment of the SMI method 1400 is illustrated in FIG. 14. In the SMI method, a READ HPA PARAMETER table is accessed to determine the HPA sector to be read 1410. For example, an applications program run by the OS sends an SMI command to the SMI handler designating specific HPA sectors to be read (i.e., an HPA read request). The SMI handler issues a SET MAX UNLOCK command that requires a password 1420. The applications program does not provide a password. The SMI handler, which is part of the host BIOS, must issue an internal password as a SET MAX UNLOCK command parameter in order for that command to succeed. The SMI handler is then able to successfully issue other SET MAX commands that allow the SMI handler to communicate with the media controller to read requested sectors and pass the data read to the applications program that has issued the command (i.e., write the data to the applications program's memory buffer). A SET MAX SET NON-HPA MAX ADDRESS command is issued where the address is a value greater than the address value of the sector to be read 1430. Most PC chipsets support SMI command generation via an I/O write to an SMI port. The command may be issued by any software entity including the host BIOS. The write to the I/O port of the system (or, I/O) controller loads a value into the SMI register and causes assertion of the SMI signal. The value written is interpreted by the SMI handler as a specific SMI command. The SMI handler determines the address to write the HPA sector from the READ HPA PARAMETER table 1440 and writes the HPA sector to this address 1450 (e.g., a system RAM address). A new SET MAX SET NON-HPA MAX ADDRESS command 1460 and SET MAX LOCK command 1470 may be issued before returning control to the applications program 1480.

Figure 15:
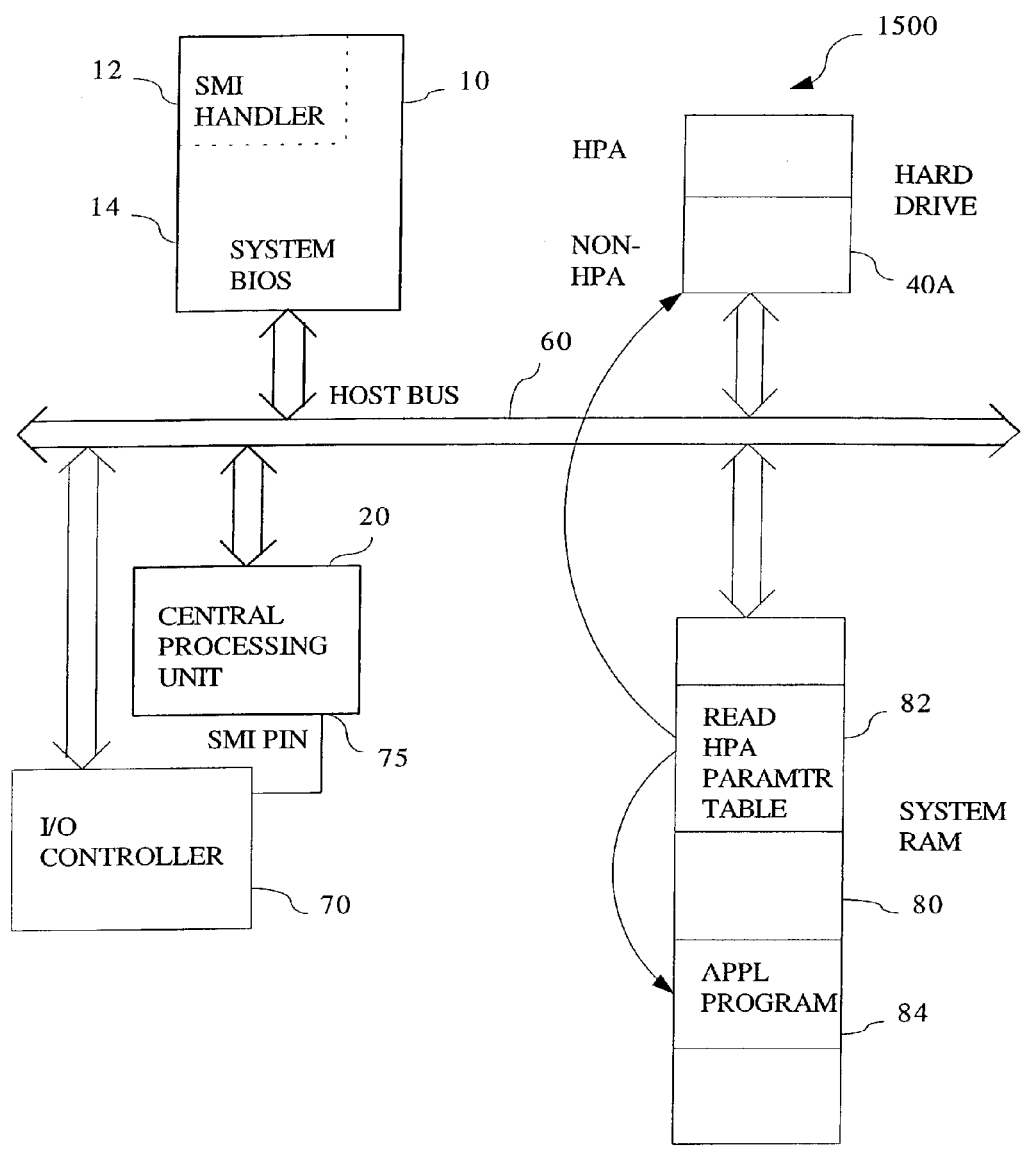
FIG. 15 illustrates process flow of an embodiment of the SMI method of FIG. 14.

The SMI Method provides HPA READ support by defining an SMI based READ HPA command. An SMI command results in host BIOS assuming complete system control. An exemplary set of steps are provided immediately below:

Issue a SET MAX UNLOCK command with a password
Set a new NON-HPA MAX
Read the requested drive sector (or other media portion) and write the sector data to a media location provided by the software that issues the SMI command
Reset NON-HPA MAX
Issue a SET MAX LOCK command
Return system control FIG. 15 illustrates an embodiment of a system 1500 that uses the SMI method where the applications program 84 has been loaded into system RAM 80. The READ HPA PARAMETER table 82 resides on a different portion of system RAM 80 than does the applications program or may reside on a different media device. A READ HPA SMI command is issued to the I/O controller 70 via host bus 60 by the applications program 84. The I/O controller 70, upon decoding the READ HPA SMI command, asserts the SMI pin 75 of CPU 20, and places the READ HPA SMI command value on the host bus 60. The CPU 20 in response to the assertion of the SMI pin 75 enters System Management Mode. The SMI handler 12 reads the READ HPA SMI command value from the host bus 60. In response to the command value, the SMI handler 12 reads the READ HPA PARAMETER table 84. The SMI handler 12 then reads the designated sectors from the hard drive 40A and writes the sector data to a media location designated by the applications program.

The READ HPA SMI command passes certain parameters required by BIOS runtime support (e.g., the SMI handler) for reading hard disk sectors. Applications issuing a READ HPA SMI command may pass this information to host BIOS via a READ HPA Parameter Table similar to the format of FIG. 16A. FIG. 16A illustrates an embodiment of a table 1600 for passing parameter information between the media controller and the SMI handler. The parameters passed between the media controller and the SMI handler may include physical drive 1602, number of sectors 1604, start location of sectors 1606, target media address 1608, status code information 1610, table length 1612, table revision 1614, checksum 1616, and the like. That table may reside in a Read/Write reserved memory area (e.g., system RAM) or other memory. Applications write values to the READ HPA Parameter Table prior to issuing a READ HPA SMI command. Host BIOS is capable of accessing the READ HPA Parameter Table and maintains addressing information. Applications may require the following information before issuing a READ HPA SMI command: SMI port address, read SMI command value, maximum number of sectors that can be read per a READ HPA SMI command, location of the READ HPA Parameter Table, first readable HPA sector, number of contiguous readable sectors (or last readable HPA sector). This information may be implemented so as to not be changeable (i.e., constant).

Structures within the protected HPA may identify to the host BIOS (and therefore to the SMI handler) which HPA sectors may be read via this method. This effectively allows designating readable HPA sector ranges. It therefore allows partitioning the HPA into secure readable areas and inaccessible areas. Host BIOS provides the READ HPA Parameter Table addressing information, the number of contiguous readable sectors, and the like to the applications via an HPA Information Table 1650, as illustrated in FIG. 16B, that resides in normal host BIOS read only memory or other memory or media. The HPA Information Table contains information that is a host BIOS constant, such as signatured value 1652, SMI port address 1654, SMI command value 1656, maximum number of sectors 1658, location of READ HPA PARAMETER TABLE 1660, first readable sector of first group of sectors 1662, number of first group sectors 1664, first readable sector of second group of sectors, number of second group sectors, table length 1666, table revision 1668, checksum 1670, and the like. Therefore, it may reside in the normal host BIOS Read Only memory (e.g., address range E0000h through FFFFFh) starting at any paragraph boundary XXXX0h. It will typically be a signatured structure (i.e., beginning of the structure is identified by a signature value). Applications locate this table by searching for the signature value. The maximum number of sectors and the number of contiguous readable sectors (or last readable HPA sector) assume that readable HPA sectors are aligned contiguously. Some implementations may desire groups of contiguous readable HPA sectors. The HPA Information Table provides that information by providing an SMI port address, a read SMI command value, a maximum number of sectors that can be read per a READ HPA SMI command, location of the READ HPA Parameter Table, first readable HPA sector of a first group, number of first group sectors, first readable sector of a second group, number of second group sectors, etc.

BIOS must return READ STATUS information to an application that has issued a read request to provide error status. A status information code can be returned via the READ HPA Parameter Table. Other methods may be employed to return status information, such as an additional HPA information table field. Codes used for this purpose include all currently defined codes and an invalid transfer size code if the number of sectors to read requested by the application is greater than the maximum number of sectors field in the HPA Information Table.

Figure 17:
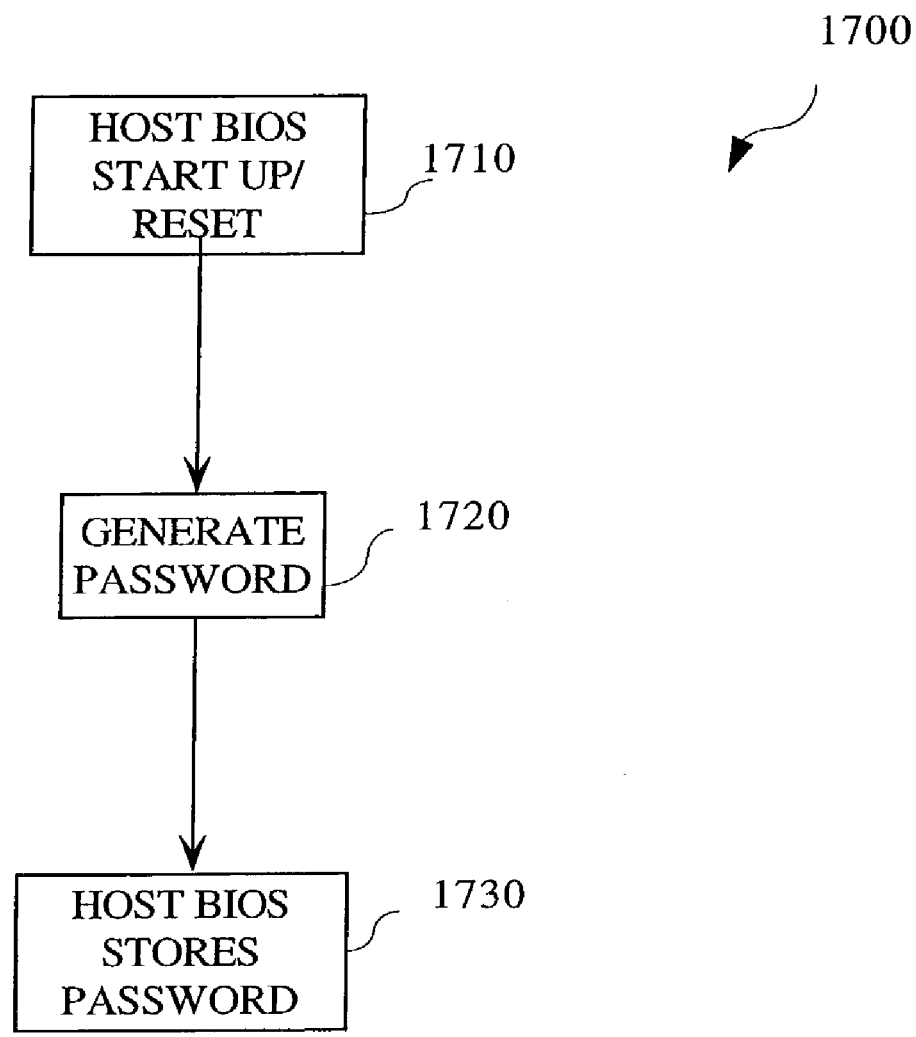
FIG. 17 illustrates an embodiment of a method for generating a password in the present invention.
Figure 18:
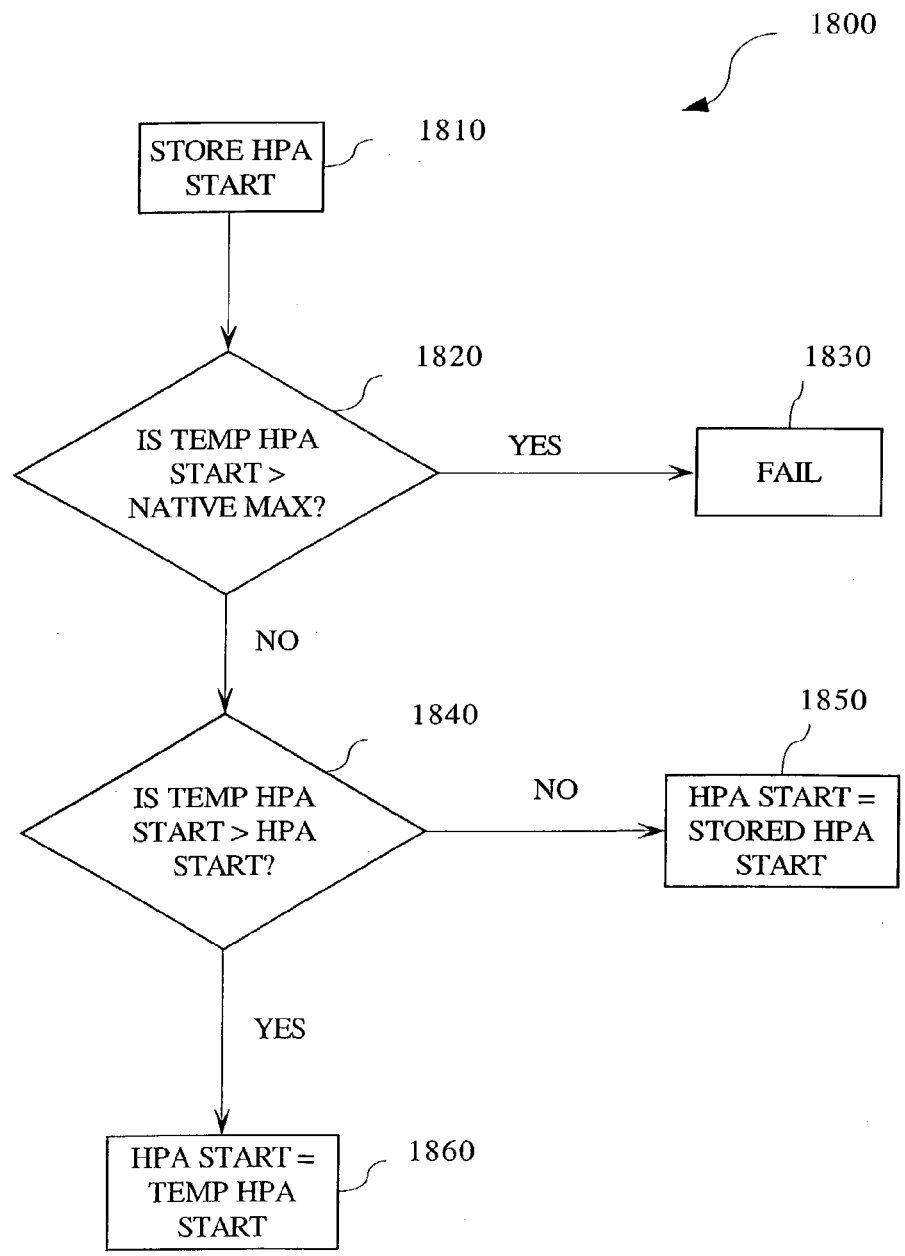
FIG. 18 illustrates an embodiment of a flow chart of the temporarily unprotected service method of the present invention.

FIG. 17 illustrates a method 1700 of generating a password for the SMI handler. The SMI method is difficult to hack because of the use of a password. In most practical applications, the HPA access requires knowledge of an HPA password, which is uniquely assigned by host BIOS start up/reset initialization code. A new randomly generated password 1720 is created upon each execution of host BIOS start up/reset initialization code 1710. The host BIOS stores the password 1730. Only host BIOS has knowledge of the password. Any 128-bit value may be used and a randomly generated value may be used for enhanced security. Values of sizes other than 128 bits may be used (e.g., 32 or 64 bits). Once a password is established and a SET MAX LOCK is issued, the SET MAX commands should not be honored until a SET MAX UNLOCK command is issued which includes the password as a command parameter or until the drive experiences an off/on cycle (i.e., a power cycle).

Figure 19A:
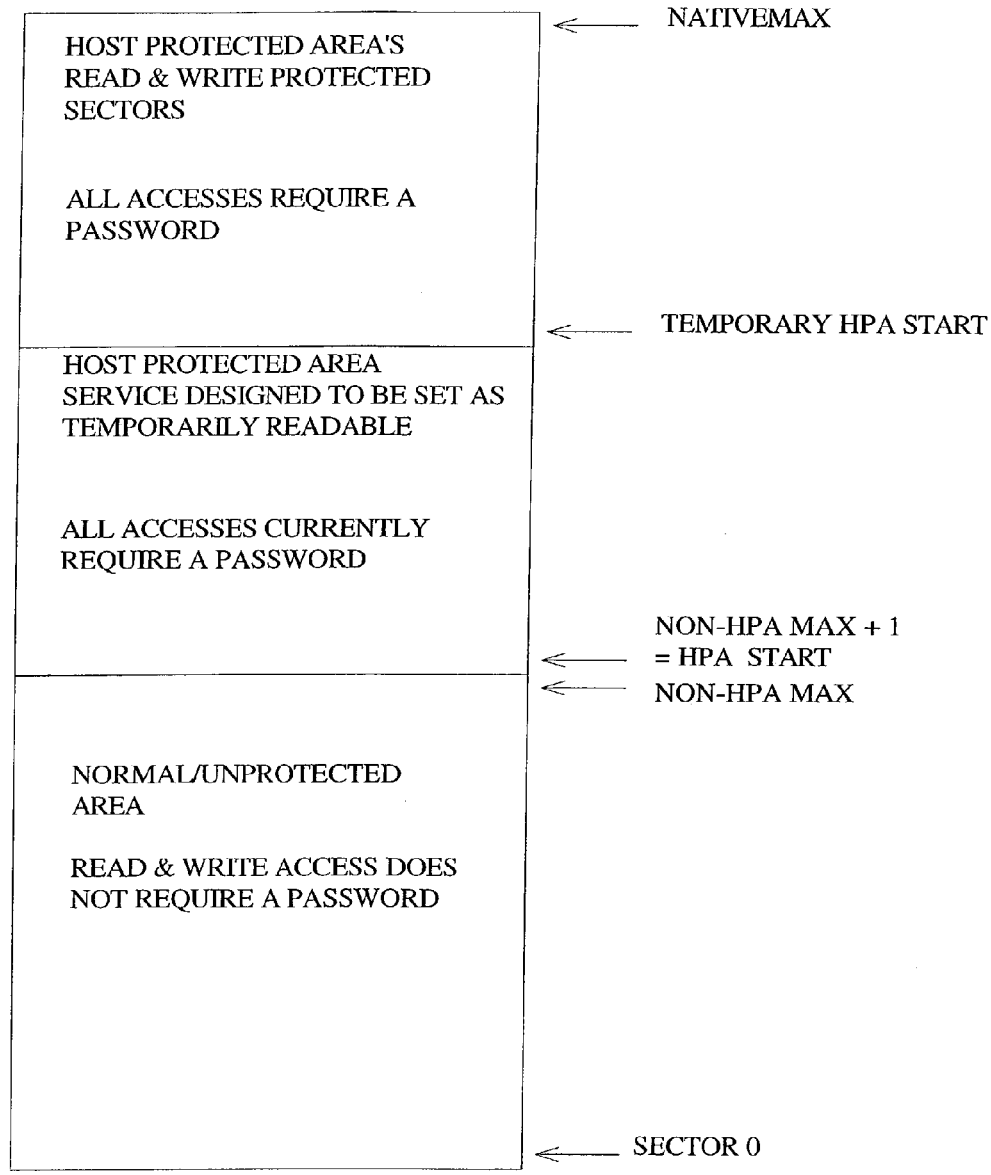
FIGS. 19A and 19B illustrate media division using an embodiment of the temporarily unprotected service method of the present invention.
Figure 19B:
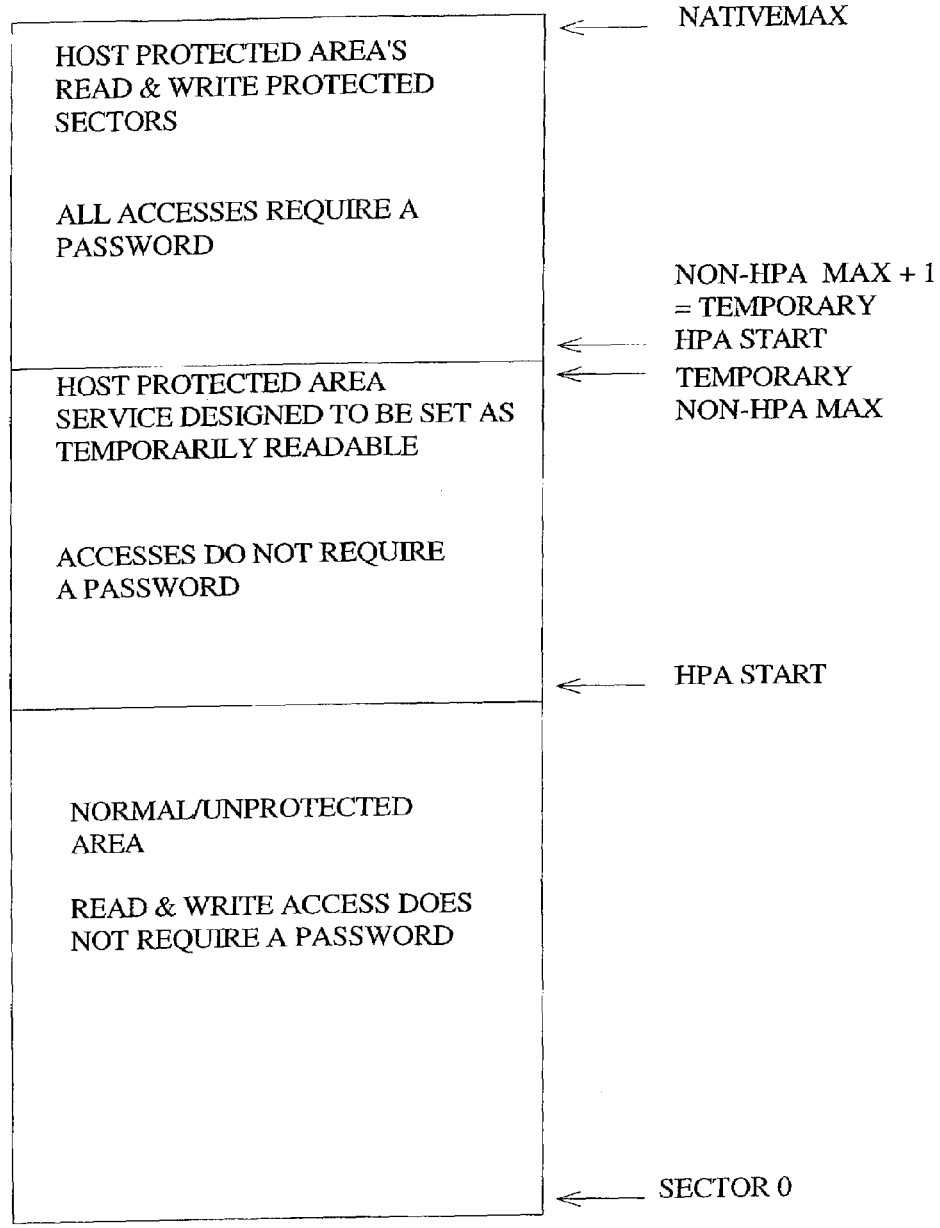

FIGS. 18, 19A, and 19B illustrate the temporarily unprotected service method. Like the SMI method, the temporarily unprotected service method is a host BIOS supported method for gaining access to the HPA. The Temporarily Unprotected Service method may leave a portion of the normally protected HPA in a temporarily unprotected state. The boundary between the protected and unprotected sectors is determined by either the HPA START or the TEMPORARY HPA START values as indicated in FIGS. 19A and 19B. Normally, HPA START is used to determine the boundary between protected and unprotected sectors, as indicated in FIG. 19A. Thus, FIG. 19A indicates that an HPA Service Area, or set of sectors that is labeled "HOST PROTECTED SERVICE AREA DESIGNED TO BE TEMPORARILY READABLE," is effectively part of the HPA and is in a protected state. Alternatively, the Temporarily Unprotected Service Method may leave a portion of the normally protected HPA in a temporarily unprotected state, as shown in FIG. 19B. In FIG. 19B, TEMPORARY HPA START is used to determine the boundary between protected and unprotected sectors. Thus, FIG. 19B indicates that the HPA Service Area, or set of sectors labeled as "HOST PROTECTED SERVICE AREA DESIGNED TO BE TEMPORARILY READABLE", is effectively not a part of the HPA and not in a protected state. This temporarily unprotected state permits unsecured read and write operations without password access and requires no hardware support changes. In one embodiment, the use of the temporarily unprotected service method serves only as a technique for changing the lower boundary of the HPA; that is, the media remains divided into two areas: a password protected HPA and a NON-HPA that offers both read and write access without a password. Alternatively, the temporarily unprotected service method may establish an area having an accessibility level that is different from the accessibility levels of the original HPA and the original NON-HPA.

In the Temporarily Unprotected Service Method, typical implementations include an HPA stored "header structure" which includes fields indicating the desired HPA START value (the HPA START value establishes the lower boundary of the HPA). During host BIOS start up/reset, host BIOS reads these structures, determines the protected/unprotected boundary, and issues commands that protect the desired HPA area. If an HPA has been defined and has been protected prior to the installation of a typical operating system, protected HPA sectors are not detected by the operating system. If, for some reason, the Operating System were allowed to boot with this area unprotected, these unprotected HPA sectors would appear as unused sectors, and would typically not be disturbed. This method takes advantage of the probability that unprotected HPA sectors would not be disturbed once an operating system has been installed. Fields within the HPA structures can be defined that will temporarily indicate a higher unprotected boundary. The difference between the normal boundary and this temporarily higher boundary can be utilized as temporarily unprotected HPA sectors.

FIG. 18 illustrates an embodiment 1800 of the temporarily unprotected service method. An HPA START value may be stored 1810 by host BIOS. A temporary HPA START may be input by an applications program. Then, a determination may be made as to whether the temporary HPA START value exceeds the NATIVEMAX value 1820. If so, the establishment of a temporarily unprotected area in the HPA fails 1830. Otherwise, a determination is made if the temporary HPA START value exceeds the stored HPA START value 1840. If it does, then HPA START is set to the stored value of HPA START 1850. Otherwise, HPA START is set to the value of temporary HPA START 1860.

The two embodiments, shown in FIGS. 19A and 19B, of the temporarily unprotected service method divide media to provide a changed accessibility level within an HPA. HPA START is equivalent to NON-HPA MAX+1 of the expanded ATA command set method, TEMPORARY HPA START is the equivalent of TEMPORARY NON-HPA MAX+1, and NATIVEMAX remains the same (i.e., the maximum physical sector supported by the drive). A temporarily unprotected portion of the HPA contains data that an HPA may make available to an application. This temporarily unprotected area of the HPA may be protected (e.g., requires a password), as shown in FIG. 19A. FIG. 19B illustrates a variation in which access to the temporarily unprotected area does not require a password. A proprietary structure within the HPA defining the temporarily unprotected portion of the HPA may be located in a host BIOS code only accessible portion of the HPA. To provide support for leaving a portion of the normally protected HPA area temporarily unprotected, a Temporary HPA Start field may be defined such that a host BIOS start up/reset (or, power on self test or POST) operation or similar operation includes the following BIOS execution pseudo code:

If [Temporary HPA Start]=0/* Default value*/
Set NON-HPA MAX=[HPA Start]/* The Temporarily Readable Service cannot be read*/
ELSE If [Temporary HPA Start]<=[HPA Start]/*Invalid Value*/
Set [Temporary HPA Start]=0
Set NON-HPA MAX=[HPA Start]/* The Temporarily Readable Service cannot be read*/
ELSE If [Temporary HPA Start]>[HPA Start]
Set NON-HPA MAX=[Temporary HPA Start]/* The Temporarily Readable Service is readable*/
Set [Temporary HPA Start]=0/* Ensures temporary exposure*/

An alternative to the embodiment of FIG. 19 uses NON-HPA MAX 1951 and temporary NON-HPA MAX 1931. Exemplary pseudo code is provided below:

If [Temporary NON-HPA MAX]=0/* Default value*/
Set NON-HPA MAX=[NON-HPA MAX]/* The Temporarily Readable Service cannot be read*/
ELSE If [Temporary NON-HPA MAX]<=[NON-HPA MAX]/*Invalid Value*/
Set [Temporary NON-HPA MAX]=0
Set NON-HPA MAX=[NON-HPA MAX]/* The Temporarily Readable Service cannot be read*/
ELSE If [Temporary NON-HPA MAX]>[NON-HPA MAX]
Set NON-HPA MAX=[Temporary NON-HPA MAX]/* The Temporarily Readable Service is readable*/
Set [Temporary NON-HPA MAX]=0/* Ensures temporary exposure*/

As a practical example, an HPA service application may be used to make some files available to the OS. Since an HPA application has full access to the HPA, the HPA application may change the "Temporary HPA Start" field to expose some normally protected sectors (which contain target files). Upon subsequent reset and normal operating system boot, those files may be temporarily exposed. An application may be launched that copies these files. Upon subsequent reset and a normal operating system boot, those files may once again be protected.

Throughout the document, it has been indicated that host BIOS can directly access the HPA. However, host BIOS cannot access hard drive sectors above the logical maximum sector set via the SET MAX SET NON-HPA MAX ADDRESS command. The term 'HPA' has been used to reference the area that is to be protected (i.e., rendered not directly accessible by other software) and not necessarily the area currently protected by the SET MAX SET NON-HPA MAX ADDRESS setting since the HPA is established immediately after power up. Even when the system is shut down, the header information indicates the HPA Start address and host BIOS is designed to use that address to physically establish the protected area. The HPA is protected whenever the host BIOS has complete system control (immediately after system power-up or reset and during System Management Mode) and after the SET MAX commands have been issued to prevent access.

It is believed that the present invention and many of its attendant advantages will be understood by the forgoing description. Features and elements of the various embodiments described hereinbefore may be used in other embodiments. It is also believed that it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An information handling system having media partitioned into different access levels by host BIOS code, the information handling system comprising:
    a host bus;
    a central processing unit coupled to the host bus;
    a host BIOS device having a host BIOS code that provides an interface with an operating system, other software applications, and hardware in the information handling system, the host BIOS code including an interrupt handler;
    mass storage device control logic communicatively coupled to the interrupt handler; and
    a mass storage device media coupled to and controlled by the mass storage device control logic,
    wherein a first portion of the mass storage device media is not directly accessible by the software other than the host BIOS code and a second portion of the mass storage device media is directly accessible by all software, at least one of the first and second portions being further partitioned to establish two or more areas of different accessibility levels for the software other than the host BIOS code, the host BIOS code creating said first portion of the mass storage device media which is not directly accessible by the software other than the host BIOS code, said first portion of the mass storage media being created with an internal password set by the host BIOS code.

2. The information handling system of claim 1, wherein the mass storage device control logic and the mass storage device media form a hard drive.

3. The information handling system of claim 2, wherein the hard drive is an Integrated Drive Electronics (IDE) hard drive.

4. The information handling system of claim 1, further comprising an external controller that serves as an intermediary between the host bus and the mass storage device control logic.

5. The information handling system of claim 4, wherein the external controller is an Advanced Technology Attachment (ATA) controller.

6. The information handling system of claim 2, wherein the hard drive is a Small Computer System Interface (SCSI) hard drive.

7. The information handling system of claim 2, wherein input/output transfers to and from the hard drive are formatted according to an Advanced Technology Attachment (ATA) specification.

8. A disk drive communicatively coupled to a host computer, said disk drive having a maximum addressable logical block address, and having a reserve area for storing information unavailable to software other than host BIOS code, said disk drive comprising:
    an interface between the disk drive and a host computer;
    a first apparatus recognizing a command sent over the interface by said host computer to reduce the maximum addressable logical block address to allow and increases in the size of the reserve area, the reserve area being created by the host BIOS code, said reserve area being created with an internal password set by the host BIOS code;
    a second apparatus for increasing the amount of disk space devoted to a reserve area for storing information unavailable to the software other than host BIOS code of the host computer and for inputting non-software other than host BIOS code accessible information to the added reserve area; and
    a third apparatus for checking some disk parameters to determine the amount of software other than host BIOS code accessible area on the disk convertible to reserve area on the disk and vice versa,
    wherein two or more levels of accessibility are established within either an unreserved area or within the added reserve area.

9. The disk drive of claim 8, wherein the first apparatus complies with the Advanced Technology Attachment (ATA) standard.

10. The disk drive of claim 8, wherein the first apparatus supports an Integrated Device Electronics (IDE) interface.

11. The disk drive of claim 8, wherein the first apparatus is a Small Computer System Interface (SCSI) device.

12. A computer system comprising:
    a bus for passing commands and data to components communicatively attached to the bus;
    a microcontroller communicatively attached to the bus;
    a host BIOS device having a host BIOS code that provides an interface with an operating system, other software applications, and hardware in the computer system, the host BIOS code including an interrupt handler;
    a memory communicatively attached to the bus;
    an input/output controller communicatively attached to the bus; and
    a disk drive attached to the input/output controller, wherein the host BIOS code creates a host BIOS code only accessible area on a disk drive, said host BIOS code only accessible area on a disk drive being created with an internal password set by the host BIOS code, said microcontroller capable of sending commands over said bus via said input/output controller to change an amount of host BIOS code only accessible area on a disk drive, wherein the microcontroller is capable of sending a password to the disk drive, wherein the command to change the amount of host BIOS code only accessible area on a disk drive is executed when the password is correct and wherein host BIOS code only accessible information is added after the size of the host BIOS code only accessible area is changed.

13. The computer system of claim 12, wherein the microcontroller uses a System Management Mode to send the commands to the input/output controller.

14. The computer system of claim 12, wherein the microcontroller uses an expanded Advanced Technology Attachment (ATA) command set.

15. The computer system of claim 12, wherein a part of the area inaccessible to software other than the host BIOS code is made temporarily accessible to the software other than the host BIOS code.

16. The information handling system of claim 1, wherein the internal password is a 128-bit value which is randomly generated by the BIOS code.

17. The disk drive of claim 8, wherein the internal password is a 128-bit value which is randomly generated by the BIOS code.

18. The computer system of claim 12, wherein the internal password is a 128-bit value which is randomly generated by the BIOS code.

* * * * *